Sept. 8, 1925.
E. G. BALLENGER
1,553,210
RADIO STATION INDICATOR AND FINDER
Filed March 11, 1925
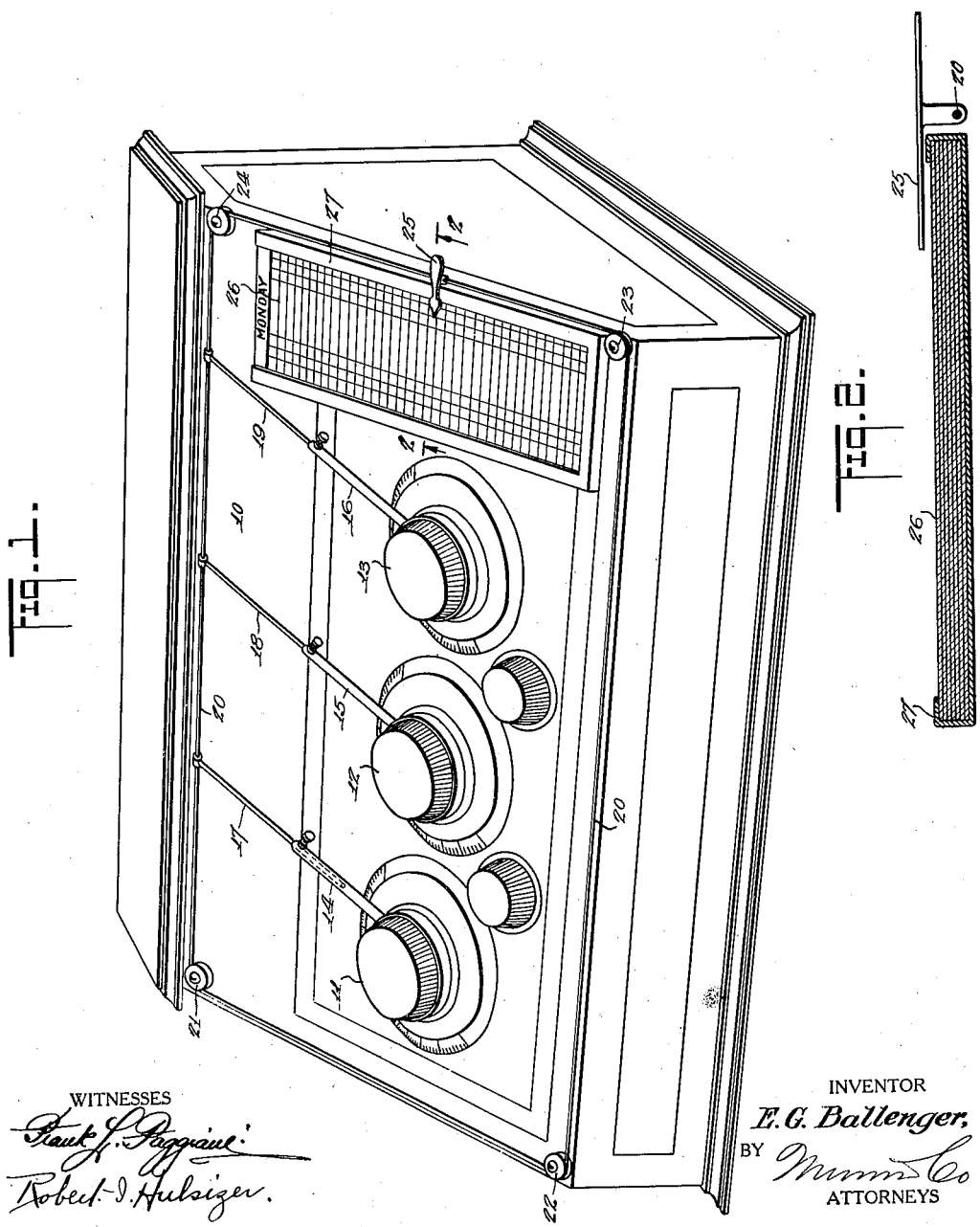
WITNESSES
INVENTOR
E. G. Ballenger,
BY
ATTORNEYS Patented Sept. 8, 1925.

1,553,210

UNITED STATES PATENT OFFICE.

EDGAR GARRISON BALLENGER, OF ATLANTA, GEORGIA.

RADIO-STATION INDICATOR AND FINDER.

Application filed March 11, 1925. Serial No. 14,828.

*To all whom it may concern:*

Be it known that I, EDGAR G. BALLENGER, a citizen of the United States, and a resident of Atlanta, in the county of Fulton and State of Georgia, have invented a new and improved Radio-Station Indicator and Finder, of which the following is a full, clear, and exact description.

This invention relates to a radio station indicator and finder. An object of the invention is to provide simple and efficient means whereby any type of sets having tuned radio frequency or sets in which dial readings are constant, can be provided with an indicator and finder so that the dials can be readily set to tune into any desired station after these stations have once been logged.

Another object concerns the provision of a simple and efficient device that can be applied to any type of set in which the dial readings are constant.

The invention is illustrated in the drawings, of which—

Figure 1 is a perspective view of a set to which the device has been applied; and Figure 2 is a section on the line 2—2 of Fig. 1.

The form of the invention shown in the drawings is a preferred form, although it is understood that modifications in the construction and arrangement of the parts and in the character of the materials used may be adopted without departing from the spirit of the invention as set forth in the appended claim.

In general, the invention comprises a cable which is connected in any suitable manner to one or more dials of the set so that as the dial is moved the cable is moved. On this cable an indicator is connected. This indicator is associated with a chart which is mounted in any suitable manner on the set, and as the dial or dials are moved to log or tune into a station the readings are marked on the chart and thereafter in order to find the station it is merely necessary to move the dials until the indicator comes to rest opposite the proper portion of the chart. This chart is preferably mounted on the face of the panelboard, and the cable and means of connecting it to the dials are also preferably mounted on the face of the panelboard, so that to apply them to the set requires substantially no alteration of the set.

In the preferred form of the invention shown in the drawings, the set is provided with a panelboard 10 on which dials 11, 12 and 13 are mounted. These dials are provided in a suitable manner with arms 14, 15 and 16 provided with adjustable extensions 17, 18 and 19. These extensions are connected in any suitable manner to a flexible cable such as 20. This cable passes over pulleys 21, 22, 23 and 24 preferably located at the four corners of the panelboard. The connection between the arms and the cable is such that whenever any one of the dials is moved the other dials are also moved as well as the cable. The cable is provided with an indicator element 25 disposed on that portion adjacent one side of the panelboard. This indicator is adapted to travel over the chart 26 mounted in a suitable frame, preferably a metal frame 27, fastened to the face of the board at one side thereof. The frame 27 may hold a plurality of charts, as shown in Fig. 2, so that there can be a chart made for the programs for every day in the week, giving the various stations with their dial readings and the programs for different hours of the day. After the set has once been calibrated so that the proper dial settings for any desired station are known and placed on the chart, it is merely necessary thereafter to tune into said station to move the dials until the indicator comes to the level on the chart occupied by the station desired, whereupon the desired station can be heard.

It is, of course, obvious that slight changes in the construction and arrangement of the parts are possible. It is desirable to have the connections between the adjustable arms 17, 18 and 19 and the cable not too rigid so that independent adjustments of the separate pulleys can be made. Furthermore, by having the arms adjustable they can be adapted for use with different sized panelboards. It is also obvious that this idea is adaptable for different sets, whether one, two, three or more dials are used. It is also quite obvious that the charts and the cables and the arms can be disposed on the inside of the panelboard, although in this case the chart would have to be visible through an opening therein.

The instant adjustment of one dial, above referred to, can be made by moving the dial with one hand while the cable is prevented from moving with the other. The fact that the arms 17, 18 and 19 are not connected too rigidly to the cable will permit the movement of the dial under these circumstances without moving the cable.

What I claim is:—

In combination, a plurality of radio dials, a panelboard on which they are mounted, a chart fastened to said panelboard, an endless cable connected to said panelboard, an indicator thereon traveling over said chart, and adjustable arms connecting the dials to the cable whereby the movement of any one of the arms causes the movement of the cable and the consequent movement of the indicator over the chart.

EDGAR GARRISON BALLENGER.